Figure 1:
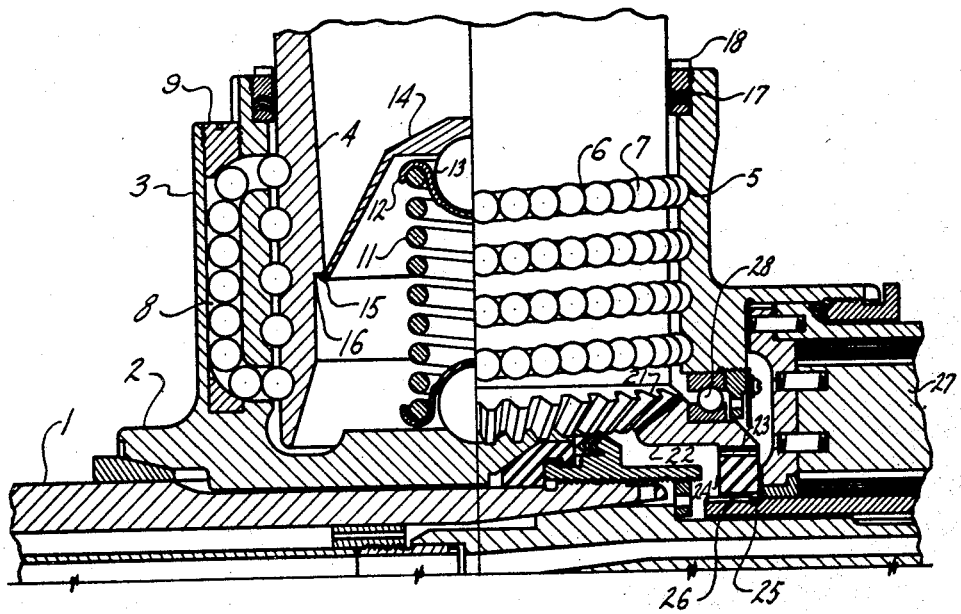

Aug. 19, 1947.  W. S. HOOVER  2,425,938
CIRCULATING BALL RACE PROPELLER BLADE BEARING
Filed Sept. 15, 1943

INVENTOR.
Walter S. Hoover
BY William B. Jaspert
Attorney.

UNITED STATES PATENT OFFICE 2,425,938

CIRCULATING BALL RACE PROPELLER BLADE BEARING

Walter S. Hoover, Grosse Pointe, Mich.

Application September 15, 1943, Serial No. 502,413

2 Claims. (Cl. 170—173)

This invention relates to new and useful improvements in bearing structures for variable pitch propellers, and it is among the objects thereof to provide anti-friction bearings for propeller blades which shall be adapted for preloading the blade bearings.

Another object of the invention is the provision of an anti-friction bearing structure for the blade roots of variable pitch propeller mechanisms employing bearing elements or balls in a circulating ball race whereby all of the bearing elements are subjected to uniform loading and wear.

Another object of the invention is the provision of means for preloading the blade bearing to any desirable degree while the structure is being assembled to facilitate blade pitch adjustment during assembly, and to permanently maintain a predetermined load on the bearing members after assembly to allow the propeller blade to sit in its correct position.

Another object of the invention is the provision of an anti-friction bearing structure for variable pitch propeller blades which shall permit blade pitch angular displacement of any desired degree.

Still a further object of the invention is the provision of a propeller bearing structure of the above-designated character incorporating helical bevel gear teeth at the tip of the blade root for coaction with a coordinating master gear, which shall permit ease of adjustment of the blade with the pitch adjusting actuator.

Figures 2, 3:
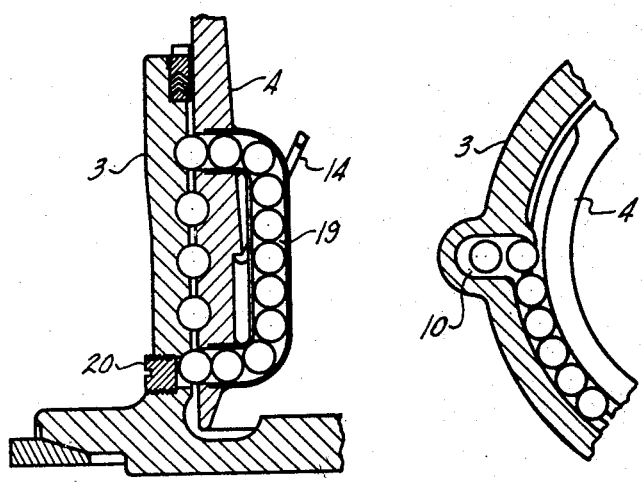

These and other objects of the invention will become more apparent from a consideration of the accompanying drawing constituting a part hereof in which like reference characters designate like parts and in which:

Fig. 1 is a vertical cross-sectional view partially in elevation of a portion of a propeller hub and blade root with an anti-friction bearing mount embodying the principles of this invention;

Fig. 2 a partial plan view thereof illustrating the bearing loading slot; and

Fig. 3 a vertical section of a portion of the propeller blade and hub showing a modified form of ball bearing retainer.

In the drawing the numeral 1 designates the propeller shaft on which is mounted the hub 2 having blade sockets 3 for receiving the root 4 of a propeller blade. The socket 3 and blade root 4 are provided with a helical groove 5 and 6, respectively, for receiving ball bearings 7. The grooves 5 and 6 may be designated the circulating channel for the ball bearing 7 which are routed through a by-pass 8 in the wall of the blade socket 3, as shown in Fig. 1, a plug 9 being provided in an elongated opening 10, Fig. 2, for inserting the ball bearings. The ball bearings are preloaded by a spring 11, the ends of which are seated in lips 12 of the spring seats, which are centered by the balls 13 that are retained by a metal cover member 14 having a flared edge 15 that interacts with a shoulder 16 formed on the inner wall of the blade root 4.

In assembling the blade in the hub socket, the preload spring 11 may be compressed to obtain any desired preloading on the bearing members, and after the bearings are assembled the assembly preload may be released to maintain the normal preloading on the bearing members supplied by the predetermined tension of the spring 11.

Chevron packings 17 secured by a retaining ring 18 are provided to seal the bearing against the escape of fluid from the hub.

In the modification shown in Fig. 3, the circulating or by-pass slot 19 is provided on the interior of the blade root 4 instead of the socket 3 shown in Fig. 1, in which case the spring retaining element 14 is provided with a cut-out portion or clearance to permit insertion of the routing passage element 19.

In the construction shown in Fig. 3, the balls are assembled through the opening that is provided with the threaded plug 20.

As shown in Fig. 1, the end of the blade root is provided with a bevel gear 21, the teeth of which are helical and which interact with the teeth of a master gear 22 to render all of the blades adjustable simultaneously in their pitch adjusting movement.

The master gear 22 interacts through teeth 23 with a ring 24 having teeth 25 interacting with the teeth 26 of the actuator, which may be operated through a fluid motor generally designated by the numeral 27 or by any other prime mover. Master gear 22 is provided with an anti-friction bearing 28, and by the use of the helical bevel gear teeth of the root gear and master gear, the normal pitch setting of the blades can be very closely matched with the normal or neutral position of the master gear actuator.

In the operation of the above described antifriction bearing blade, the ball bearings are circulated continually in the helical races of the blade and hub socket, and as each ball member reaches the opening to the by-pass 8, Fig. 1, or 19, Fig. 3, it will drop into the by-pass passage while the bottom ball member becomes entrained in the circulating helical races of the bearing.

By preloading of the blade bearings, the propeller blade is permitted to seat in its correct position and the balls are equally distributed in the race ways in the hub and blade socket.

Both the race way of the blade root and hub ferrule are ground to give a blade pitch angular displacement of any desired degree, and the degree of angularity of the helical ball races is determined in a manner to counteract the twisting movement of the blade.

The adjustment of the bearing races in coordination with the meshing of the blade root gear with the master gear is accomplished by making the blade root gear pitch line conform with the helix angle of the bearing race ways or the coordinating gear teeth may be generated so that the pitch diameter increases to insure correct contact with the blade gear.

By combining these two principles both the blade end gear and the coordinating or master gear may be cut in a manner to take up axial displacement of the blade due to the helix angle of the bearing race way.

It is evident from the foregoing description of the invention that the circulating ball race and the coordinating gear assembly permit of accurate assembly of the blades on the propeller hub for coordination with a pitch adjusting mechanism.

It is also evident that a varying structure of different type may be preloaded and that the lead of the helical race ways may be predetermined to counteract the twisting movement of the blade.

Although one embodiment of the invention has been herein illustrated and described, it will be evident to those skilled in the art that various modifications may be made in the details of construction without departing from the principles herein set forth.

I claim:

1. In a propeller blade bearing structure, a bearing sleeve fixed against rotation for receiving the propeller blade bearing, antifriction bearings interposed between the blade bearing and sleeve bearings comprising ball members, and means to obtain a desired preloading on the bearing members which comprises a loading bracket disposed centrally of the propeller blade root and abutting against the propeller blade, spring means disposed between said preloading bracket and the propeller hub comprising a plurality of hemispherical flanged spring seats for engaging the ends of a coil spring in their respective seats, and balls disposed in the hemispherical surface of said spring seats for engagement with the propeller hub and said preload bracket.

2. A propeller blade bearing structure comprising a hub socket having a continuous helical ball bearing race in the inner wall thereof, a propeller blade journalled in said socket having a helical ball bearing race in the outer wall of the blade root, the upper and lower extremities of said bearing races having a communicating ball passage, ball bearings disposed in said races and communicating passage to substantially provide for circulation of the balls in said races when the bearing members are subjected to relative angular movement, and means for preloading said ball bearings comprising a coil spring, a retaining bracket for said spring abutting the lower end of said blade root, a coil spring interposed between said retaining bracket and the propeller hub being compressed to assert a force axially against the blade root to preload the ball bearings in the bearing races.

WALTER S. HOOVER.

REFERENCES CITED

The following references are of record in the file of this patent:

UNITED STATES PATENTS

| Number | Name | Date |
|---|---|---|
| 1,851,874 | Seppeler | Mar. 29, 1932 |
| 1,955,688 | Seppeler | Apr. 17, 1934 |
| 488,778 | Pratt | Mar. 24, 1891 |
| 2,159,225 | Phelps | May 23, 1939 |
| 1,704,031 | Boehm | Mar. 5, 1929 |
| 2,298,011 | Hoffar | Oct. 6, 1942 |
| 1,921,942 | Ratier | Aug. 8, 1933 |
| 2,343,507 | Hoffar | Mar. 7, 1944 |

FOREIGN PATENTS

| Number | Country | Date |
|---|---|---|
| 131,475 | Great Britain | Aug. 28, 1919 |
| 587,378 | France | Jan. 16, 1925 |
| 688,552 | France | May 13, 1930 |
| 486,614 | Great Britain | June 8, 1938 |
| 378,524 | France | Oct. 8, 1907 |